(12) United States Patent
Choi

(10) Patent No.: US 7,494,353 B2
(45) Date of Patent: Feb. 24, 2009

(54) CARD EJECTING MECHANISM AND MOBILE COMMUNICATION TERMINAL HAVING THE SAME

(75) Inventor: Seong-Woo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 11/445,825

(22) Filed: Jun. 2, 2006

(65) Prior Publication Data
US 2006/0274511 A1 Dec. 7, 2006

(30) Foreign Application Priority Data
Jun. 2, 2005 (KR) ............... 10-2005-0047420

(51) Int. Cl.
*H01R 13/62* (2006.01)
(52) U.S. Cl. ........................................ 439/159
(58) Field of Classification Search ............ 439/155, 439/159–160, 142, 144
See application file for complete search history.

(56) References Cited

U.S. PATENT DOCUMENTS 6,102,721 A 8/2000 Seto et al.
7,086,887 B2 * 8/2006 Tsai et al. ............... 439/331
2002/0177337 A1 11/2002 Chen
2006/0231619 A1 10/2006 Wei-Lung

FOREIGN PATENT DOCUMENTS

| EP | 0349210 | 1/1990 |
|---|---|---|
| EP | 0585825 | 3/1994 |
| EP | 1316914 | 6/2003 |
| EP | 1378857 | 1/2004 |
| KR | 10 2002 0018283 A | 3/2002 |

* cited by examiner

*Primary Examiner*—Javaid Nasri
(74) *Attorney, Agent, or Firm*—Lee, Hong, Degerman, Kang & Waimey

(57) ABSTRACT

A mobile communication terminal having a card ejecting mechanism. The card ejecting mechanism includes a body having a card insertion hole through which a card is insertable in a push manner; a cover openably mounted at the body for covering the card; and an operation unit disposed at the cover for releasing a locked state of the cover and releasing a locked state of the card when pushed. A locked state of the card is released and the cover is opened by one push operation, thereby enhancing a user's convenience. Furthermore, since a small member such as a push rod is used to release a locked state of the card, the conventional user's finger inserting space for pressing the card is not required thus to enable a miniaturization of the mobile communication terminal.

28 Claims, 8 Drawing Sheets

CARD EJECTING MECHANISM AND MOBILE COMMUNICATION TERMINAL HAVING THE SAME

CROSS-REFERENCE TO RELATED APPLICATION

Pursuant to 35 U.S.C. § 119(a), this application claims the benefit of earlier filing date and right of priority to Korean Patent Application No. 10-2005-0047420, filed on Jun. 2, 2005, the content of which is hereby incorporated by reference herein in its entirety.

BACKGROUND OF THE INVENTION

1. Field of the Invention

The present invention relates to a card ejecting mechanism and a mobile communication terminal having the same, and more particularly, to a card ejecting mechanism capable of ejecting a card mounted at a body and opening a cover for covering the card by one operation in a push manner, and a mobile communication terminal having the same.

2. Description of the Background Art

A mobile communication terminal including a mobile phone, a personal digital assistant (PDA), etc. is an electronic device to perform a wireless transmission/reception or to provide information to a user while the user moves.

As information communication technique and memory technique develop, a mobile communication terminal is being provided with a function to transceive or view multimedia. For instance, the mobile communication terminal is provided with a function for reproducing a moving image file such as a video on demand (VOD) or a game, a function for reproducing a music file such as an MP3, or a function for receiving a television broadcasting using a satellite communication.

As the multimedia is much utilized by the mobile communication terminal, a memory for storing the multimedia is much required. However, it is difficult to unlimitedly increase a size of the memory inside the mobile communication terminal. Also, it is not necessarily preferable to increase the size of the memory for a fast data transmission.

Accordingly, an external memory mounted at an outer side of the mobile communication terminal is being much applied for a capacity increase and an easy replacement. For instance, an external card such as a secure digital (SD), a multimedia card (MMC), a smart media, etc. is mounted at the mobile communication terminal.

FIG. 1 is a schematic view showing a card ejecting mechanism in accordance with the related art. As shown, a card inserting hole 2 is formed at one side of a body 1, and a card socket 3 for inserting a card 5 is disposed in the card inserting hole 2.

The card socket 3 has a card locking unit 4 for locking the card when the card 5 is pressed one time and unlocking the card from the card socket 3 when the card 5 is re-pressed in a push manner.

A cover 6 for protecting the card 5 from dust or an external impact is provided at one side of the card inserting hole 2.

Under the construction, in order for the card 5 to be inserted into the body 1, the cover 6 is opened and then the card 5 is inserted into the card socket 3.

Then, a certain force is applied to the card 5, so that the card 5 moves into the card socket 3. Then, if the force is removed, the card 5 is locked to the card socket 3 and thus an electrical connection between the card 5 and the body 1 is maintained.

When the card 5 has been mounted at the body 1, the cover 6 is rotated thereby to close the card inserting hole 2.

An opposite process to the above process is performed to eject the card 5 from the body 1.

First, the cover 6 is opened and then the card 5 is pushed by a certain force, thereby unlocking the card 5 from the card locking unit 4. As the result, the card 5 is ejected by an elastic member (not shown) installed in the card socket 3.

However, the related art card ejecting mechanism has the following inconvenience. That is, in order to eject the card 5 from the card socket 3, the cover 6 has to be opened and then the card 5 has to be pushed.

Furthermore, in order to push the card 5, a finger inserting portion (not shown) for inserting a user's finger has to be provided, which causes a large size of the mobile communication terminal.

BRIEF DESCRIPTION OF THE INVENTION

Therefore, an object of the present invention is to provide a card ejecting mechanism capable of enhancing a user's convenience by unlocking a card such as an external memory and a cover for covering the card by one operation, and a mobile communication terminal having the same.

Another object of the present invention is to provide a card ejecting mechanism capable of decreasing a volume of a mobile communication terminal by requiring no space for pushing a card, and a mobile communication terminal having the same.

To achieve these and other advantages and in accordance with the purpose of the present invention, as embodied and broadly described herein, there is provided a card ejecting mechanism, comprising: a body having a card insertion hole through which a card is insertable in a push manner; a cover openably mounted at the body for covering the card; and an operation unit disposed at the cover for releasing a locked state of the cover and releasing a locked state of the card when pushed.

Preferably, the card is mounted at the body so as to be locked when pushed and unlocked when re-pushed.

The card can be at least one of a memory card, user identification card, and banking card.

The cover has one end hinge-connected to the body and another end locked at the body by the operation unit.

The operation unit comprises: an operation button disposed at the cover; a push rod connected to the operation button for pushing the card; and a cover locking portion disposed at the cover for releasing a locked state of the cover when the operation button is lowered.

The operation button is mounted so as to be movable up and down.

The operation button can be integrally formed with the cover.

The operation button is disposed at a guide groove formed at the cover so as to be movable up and down, and an elastic member for providing an elastic force to the operation button in a lifting direction is formed at a lower surface of the operation button.

The push rod is integrally formed at a lower surface of the operation button, and has a length long enough to be in contact with an upper surface of the card.

The cover locking portion comprises: a locking member slidingly disposed at a slide groove formed at the cover for locking the cover; and an operation member connected to the locking member for moving the locking member in a direction to release a locked state of the cover when the operation button is lowered.

Preferably, the operation member is formed of a wire, and is deformed by a motion of the operation button thereby to move the locking member.

The cover locking portion further comprises an elastic member for restoring the locking member.

The operation unit comprises: an operation button disposed at the cover so as to be movable in a horizontal direction; a push rod disposed at the cover so as to be movable up and down for pushing the card by being in contact with the operation button when the operation button is horizontally moved; and a cover locking portion disposed at the cover for releasing a locked state of the cover when the operation button is horizontally moved.

The operation button is disposed at the cover so as to be movable in a horizontal direction, and an inclined surface for pushing the push rod when the operation button is horizontally moved is formed at a lower surface of the operation button.

The push rod is disposed at the cover so as to be movable up and down, and an elastic member for providing an elastic force to the push rod in a direction to restore the button is disposed at a lower portion of the push rod.

The cover locking portion comprises: a locking member slidingly disposed at a slide groove formed at the cover for locking the cover; and an elastic member for providing an elastic force in a direction to restore the locking member.

To achieve these and other advantages and in accordance with the purpose of the present invention, as embodied and broadly described herein, there is also provided a mobile communication terminal, comprising: a terminal body having a card insertion hole through which a card is insertable in a push manner; a cover openably mounted at the body for covering the card; and an operation unit disposed at the cover for releasing a locked state of the cover and releasing a locked state of the card when pushed.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a mobile communication terminal according to the present invention will be explained. Even if a folder type mobile communication terminal is implemented in the preferred embodiment, the present invention can be also applied to a bar type mobile communication terminal or a slide type mobile communication terminal.

Figure 1:
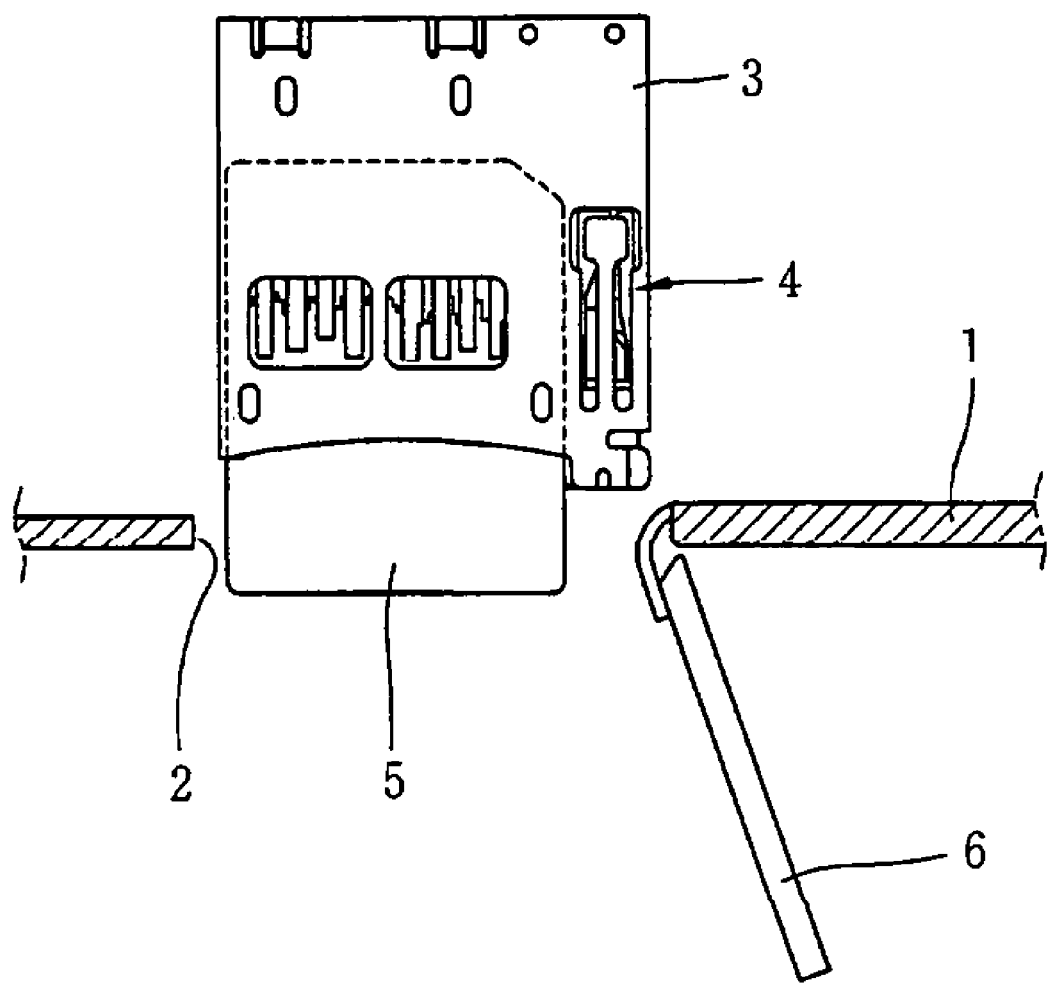
FIG. 1 is a schematic view showing a card ejecting mechanism in accordance with the related art.
Figure 2:
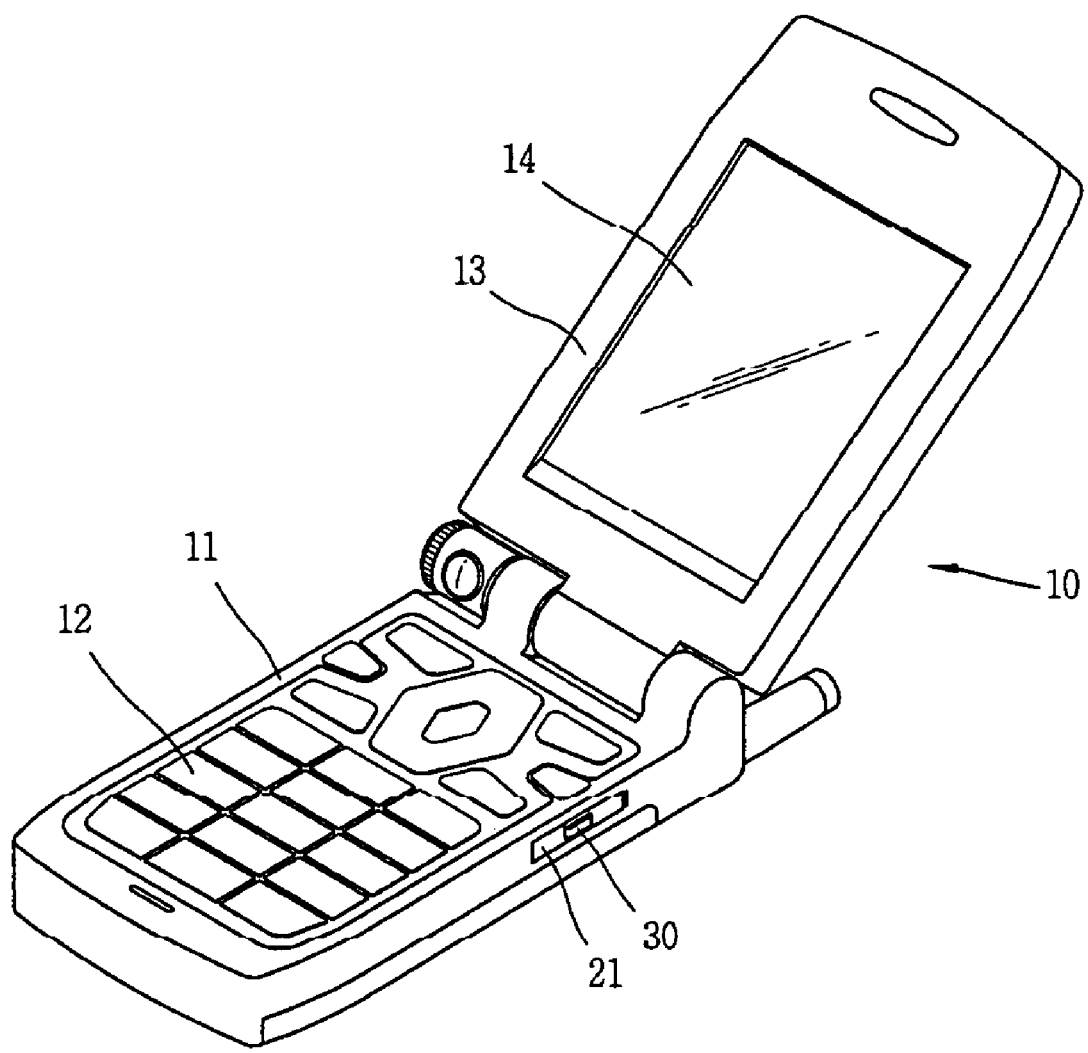
FIG. 2 is a perspective view showing a mobile communication terminal according to a first embodiment of the present invention.

FIG. 2 is a perspective view showing a mobile communication terminal according to a first embodiment of the present invention.

As shown, a mobile communication terminal 10 comprises a first terminal body 11 having a key pad 12 and a display 14 at an upper surface thereof, and a second terminal body 13 connected to the first terminal body 11 by a hinge.

The first terminal body 11 has a card insertion hole(not shown) through which a card(not shown) is insertable in a push manner.

A cover 21 for covering the card mounted at the first terminal body 11 so as to be ejectable from the first terminal body 11 in a push manner, and an operation unit 30 installed at the cover 21 for releasing a locked state of the cover 21 and releasing a locked state of the cover 21 when pushed are installed at a side surface of the first terminal body 11.

Figure 3:
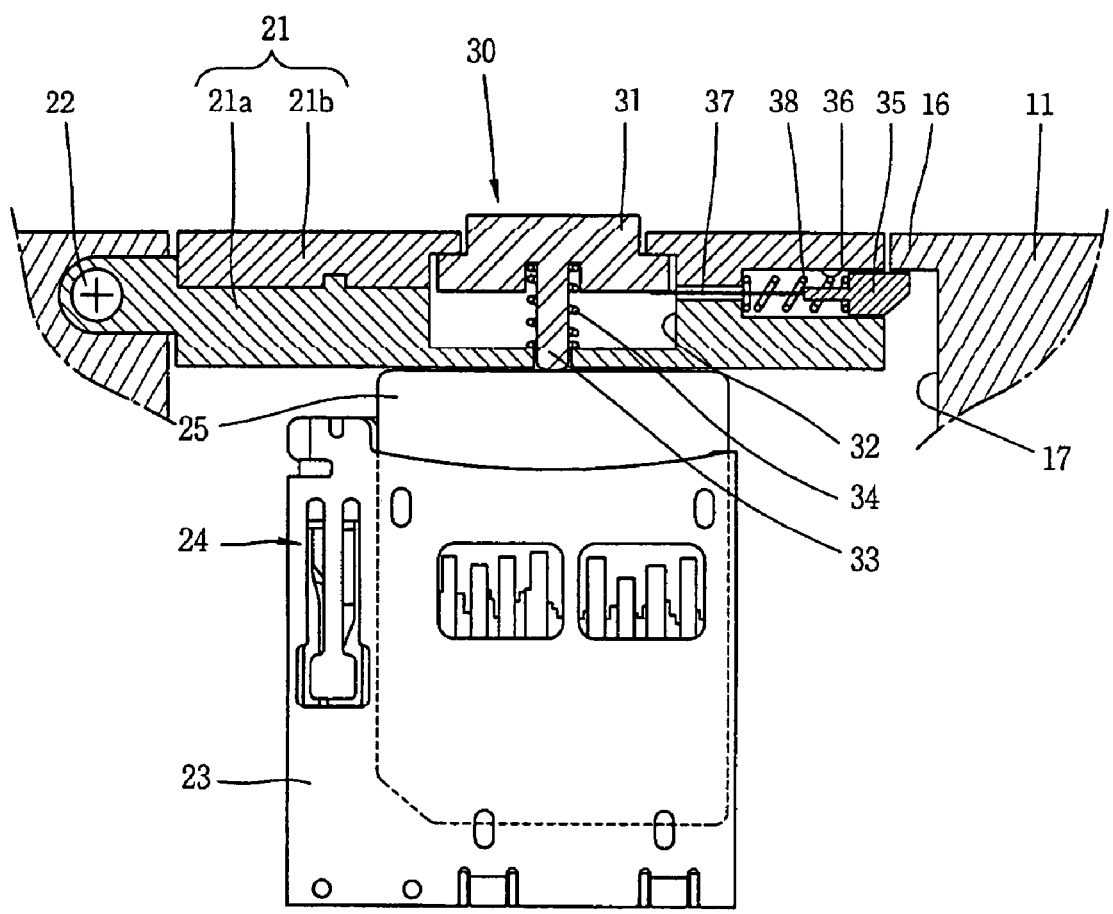
FIG. 3 is a sectional view showing a card ejecting mechanism of FIG. 2.

FIG. 3 is a sectional view showing a card ejecting mechanism of FIG. 2.

As shown, a card socket 23 for locking the card 25 thereby electrically connecting to the first terminal body 11 is installed in a card inserting hole 17 formed at the first terminal body 11.

A card locking unit 24 for locking the card 25 to the first terminal body 11 when pushed one time and for releasing the locked state of the card 25 when re-pushed is installed at the card socket 23.

The card 25 is implemented as a memory card, but can be implemented as a user identification card or a banking card.

The cover 21 has one end connected to the first terminal body 11 by a hinge 22 and another end locked at the first terminal body 11 by the operation unit 30. The first terminal body 11 is provided with a stopping jaw 16 for stopping the cover 21 by the operation unit 30.

The cover 21 for mounting the operation unit 30 is composed of an upper cover 21b and a lower cover 21a.

The operation unit 30 comprises an operation button 31 disposed at the cover 21 so as to be movable up and down, a push rod 33 connected to the operation button 31 for pushing the card 25, and a cover locking portion disposed at the cover 21 for releasing a locked state of the cover 21 when the operation button 31 is lowered.

As another modification example, the operation button 31 can be integrally formed with the cover 21.

A guide groove 32 for guiding the operation button 31 to be movable up and down is installed at the cover 21, and an elastic member 34 for providing an elastic force to the operation button 31 in a lifting direction is formed at a lower surface of the operation button 31.

Preferably, the push rod 33 is integrally formed at a lower surface of the operation button 31, and has a length long enough to be in contact with an upper surface of the card 25. Accordingly, while the push rod 33 is lowered by a lowering of the operation button 31, the card 25 is also pressed.

The cover locking portion comprises: a locking member 35 slidingly disposed at a slide groove 36 formed at the cover 21 for locking the cover 21, and an operation member 37 connected to the locking member 35 for moving the locking member 35 in a direction to release a locked state of the cover 21 when the operation button 31 is lowered.

As shown, the operation member 37 is formed of a wire that can be flexibly deformed even when a motion direction of the button 31 is different from a motion direction of the locking member 35.

The operation of the card ejecting mechanism according to the present invention will be explained.

FIG. 3 is a view showing that the card 25 is inserted into the card socket 23 thus to be locked, and the cover 21 is stopped by the stopping jaw 16 thus to be locked.

A user operates the operation unit 30 in order to eject the card 25 from the card socket 23 and open the cover 21.

Figure 4:
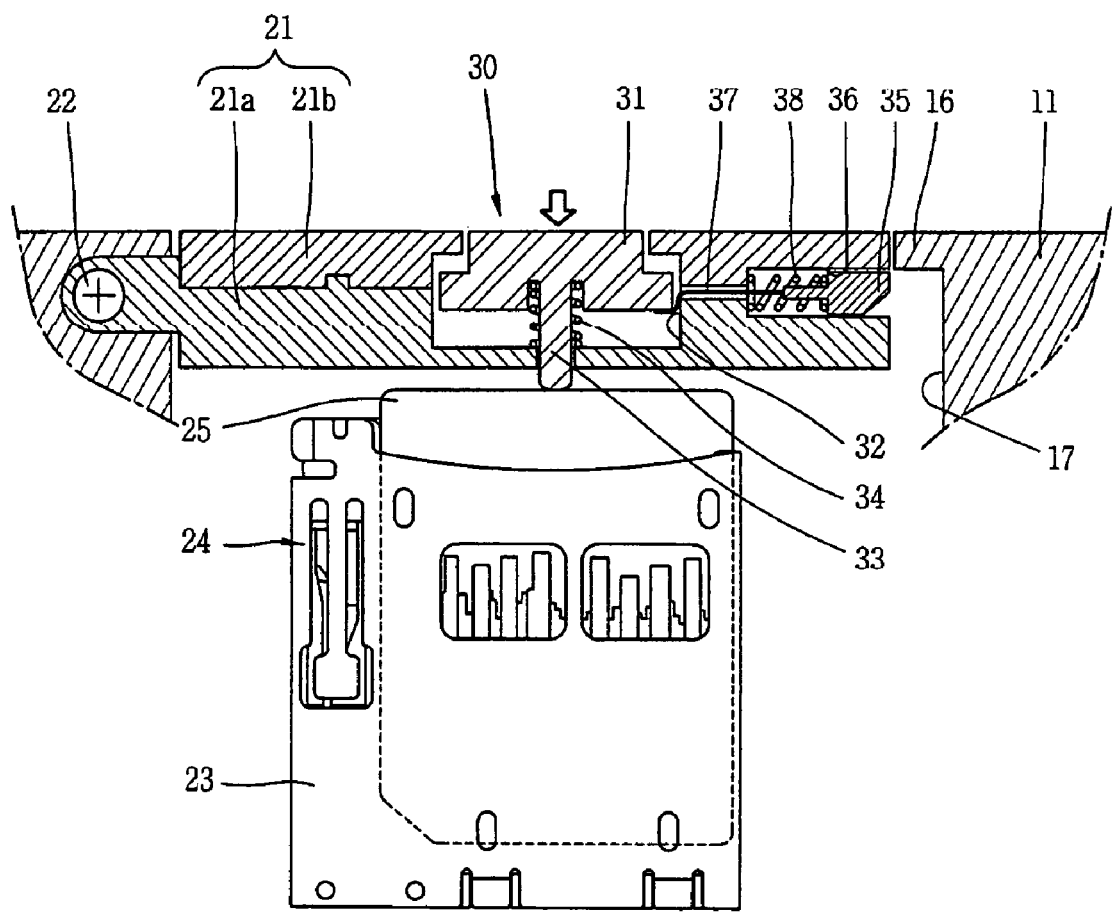
FIGS. 4 and 5 are views showing each motion of a cover and a card when an operation button is pushed.
Figure 5:
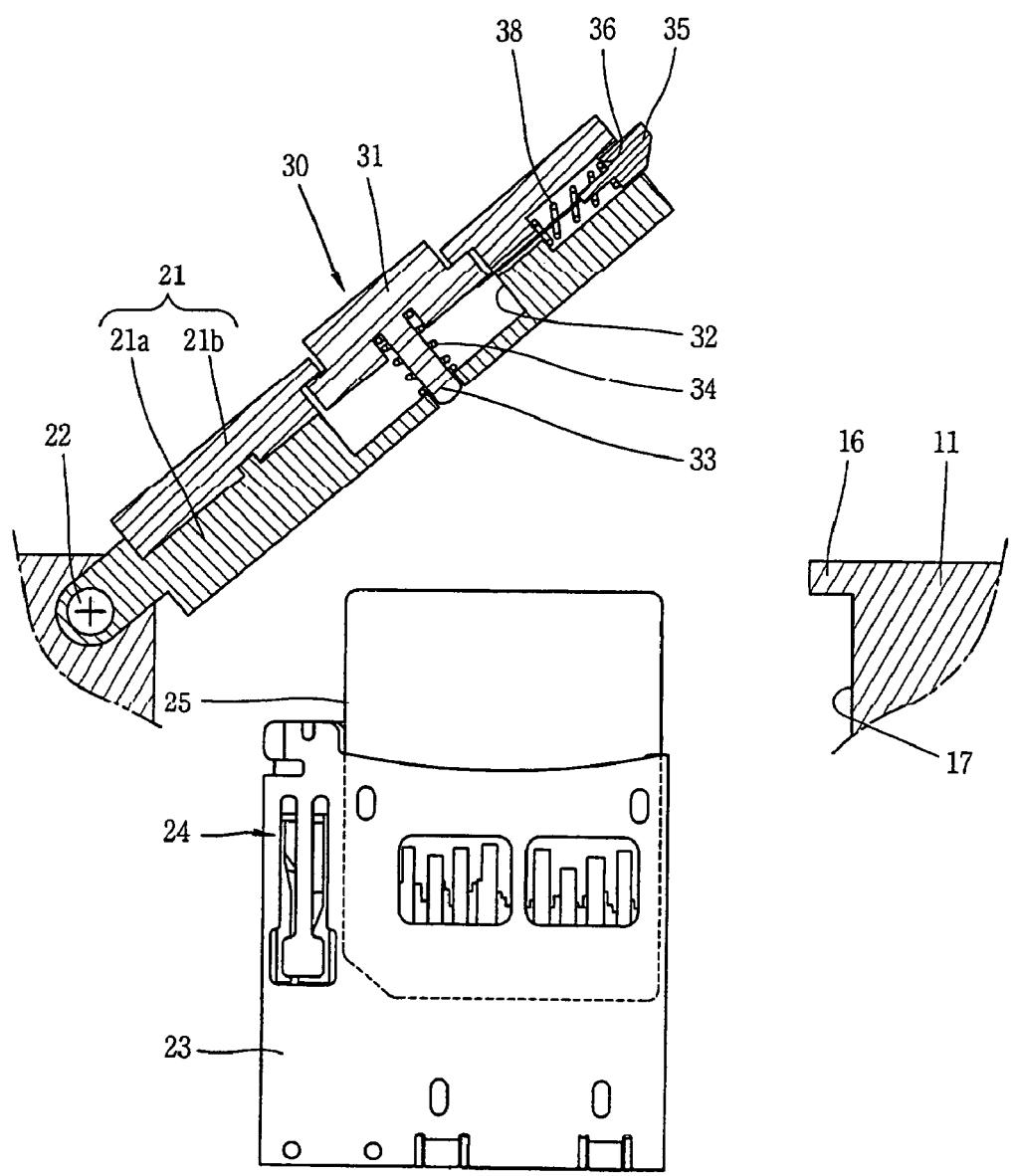

FIGS. 4 and 5 are views showing each motion of a cover and a card when an operation button is pushed.

As shown in FIG. 4, when the operation button 31 is pushed, the push rod 33 is also pressed. Then, if the push rod 33 pushes the card 25 into the card insertion hole 17, the locked state of the card 25 is released by the card locking unit 24.

At the same time, the wire 37 connected to the operation button 31 is also moved along the motion direction of the operation button 31, thereby detaching the locking member 35 from the stopping jaw 16.

When the force applied to the operation button 31 is removed, the card 25 pushes the cover 21 and is ejected from the card socket 23 by an elastic unit (not shown) (Refer to FIG. 5).

That is, a mechanism for releasing each locked state of the card 25 and the cover 21 by one push operation is implemented.

When the cover 21 is lifted up, the operation button 31 is upwardly moved by the elastic member 31 installed at a lower surface of the operation button 31, and the locking member 35 is restored to the original position by the elastic member 38.

In order to mount the card 25 to the card socket 23, the card 25 is inserted into the card socket 23 and then the cover 21 is pressed. That is, as the cover 21 is pressed, the card 25 is together pressed thus to be locked by the card locking unit 24, and at the same time, the locking member 35 is stopped by the stopping jaw 16 thus to be locked.

Figure 6:
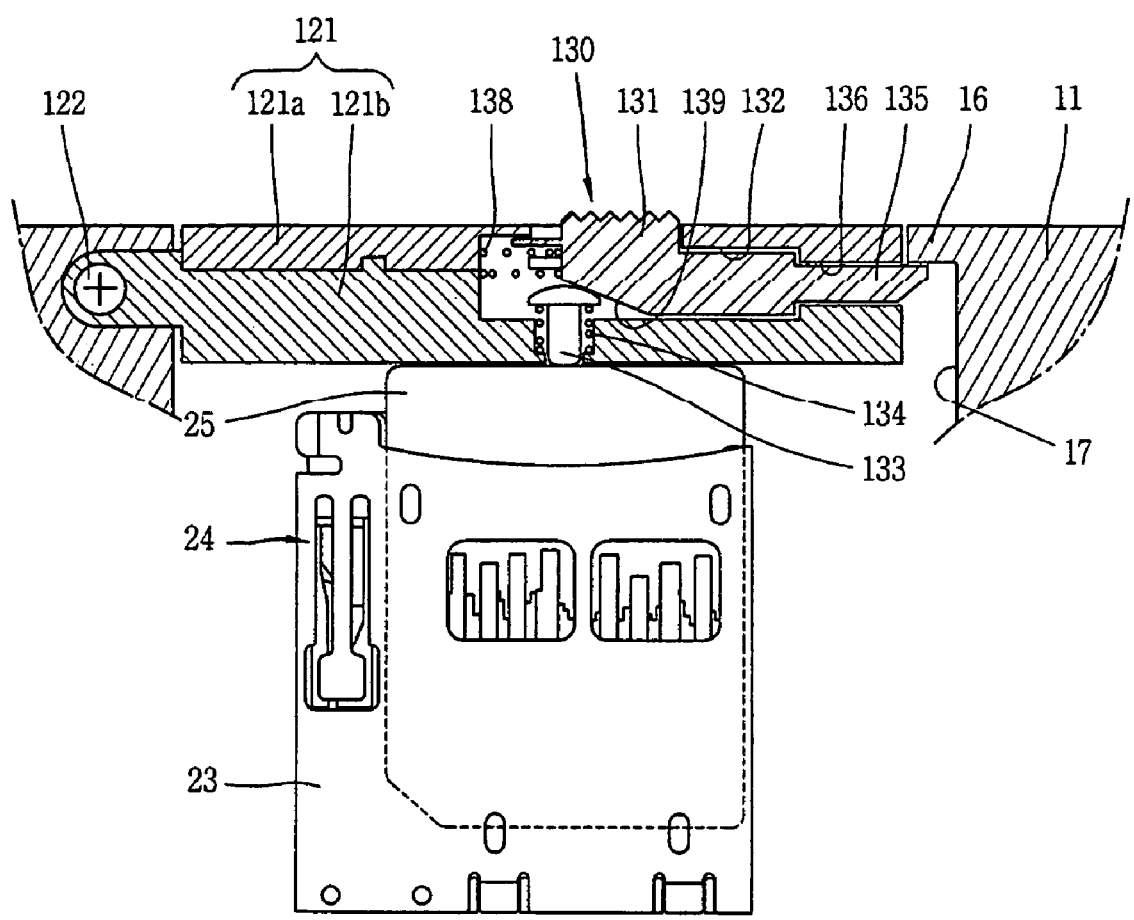
FIG. 6 is a sectional view showing a card ejecting mechanism according to a second embodiment of the present invention.

FIG. 6 is a sectional view showing a card ejecting mechanism according to a second embodiment of the present invention, in which each locked state of the cover 21 and the card 25 can be released by pushing the operation button 131 in a horizontal direction.

The cover 121 is composed of an upper cover 121a and a lower cover 121b, and is provided with a guide groove 132 for guiding the operation button 131 to be horizontally moved therein.

A push rod 133 for pressing an upper surface of the card 25 is mounted at a lower portion of the guide groove 132 so as to be movable up and down.

An elastic member 134 for providing an elastic force to lift the downwardly pressed push rod 133 when the operation button 131 is moved in an opposite direction (that is, the right direction in drawing, a cover locking direction) is installed at a lower portion of the push rod 133.

An inclination surface 139 for pressing the push rod 133 while the operation button 131 is horizontally moved is formed at a lower surface of the operation button 131.

A locking member 135 for locking the cover 121 to the stopping jaw 16 or detaching the cover 121 from the stopping jaw 16 by horizontally moving the operation button 131 is connected to one side of the operation button 131.

The locking member 135 is slidingly arranged at a slide groove 136 formed at the cover 121, and an elastic member 138 for providing an elastic force to restore the horizontally-moved operation button 131 and the locking member 135 to the original positions is installed at one side of the operation button 131.

The operation of the card ejecting mechanism according to the present invention will be explained.

Figure 7:
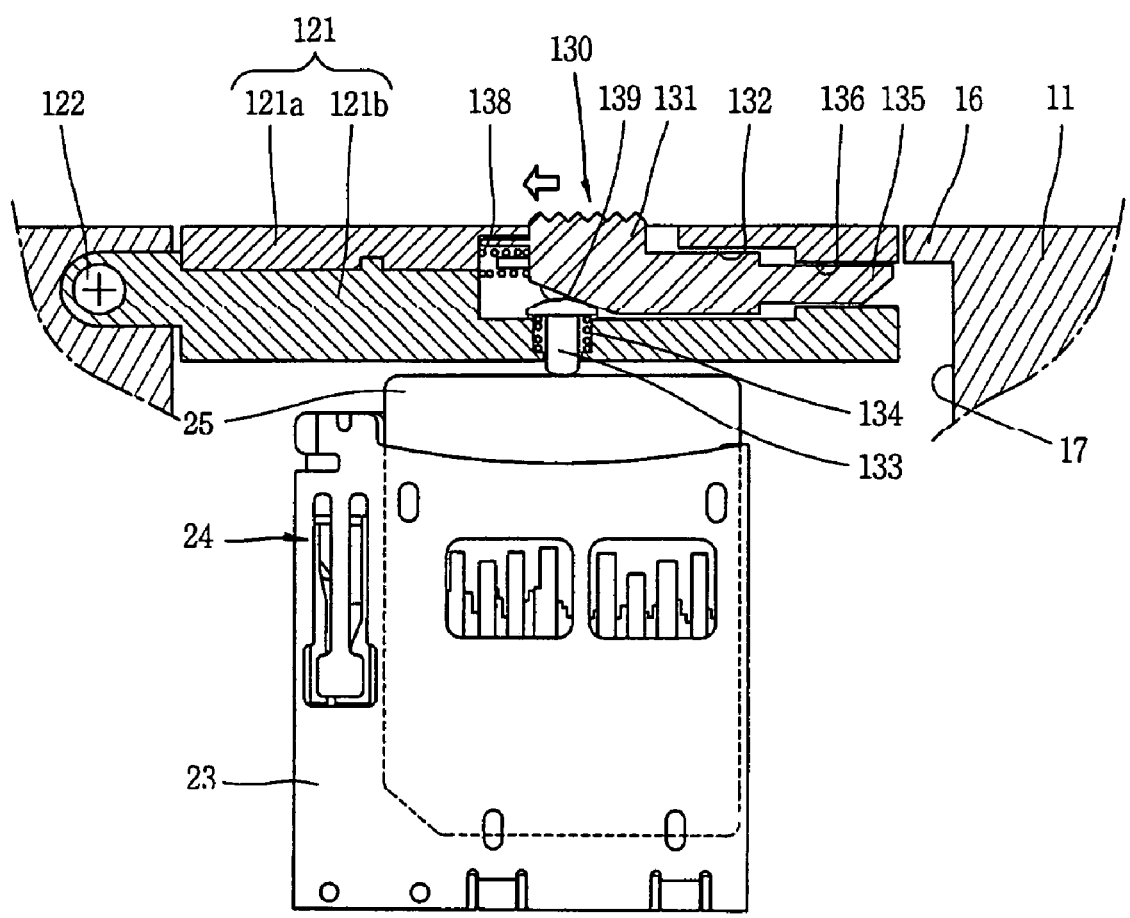
FIGS. 7 and 8 are views showing each motion of a cover and a card when an operation button is pushed according to the present invention.
Figure 8:
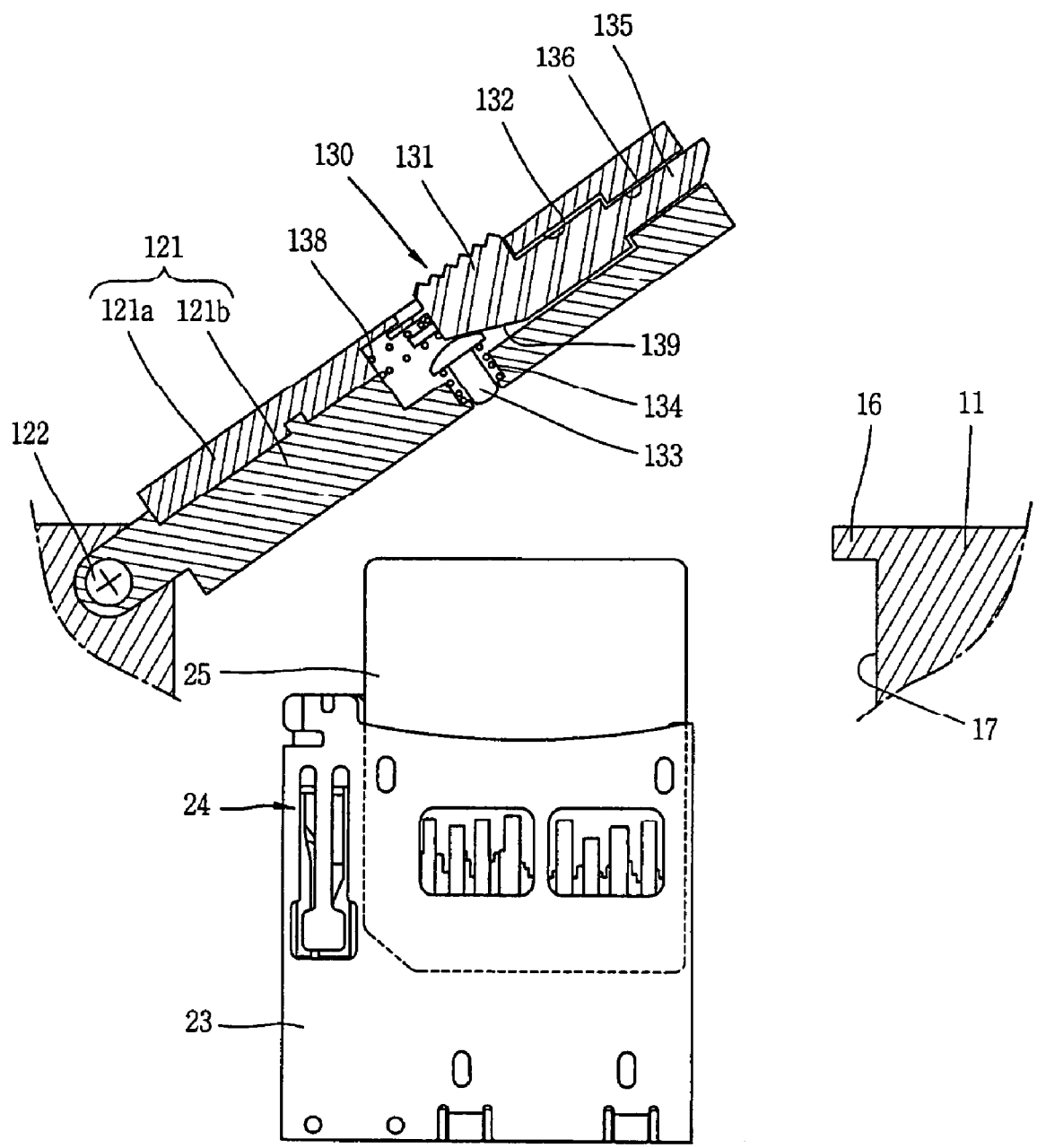

FIGS. 7 and 8 are views showing each motion of a cover and a card when an operation button is pushed according to the present invention.

Referring to FIG. 7, when the operation button 131 of FIG. 6 is horizontally pushed (the left direction in drawing), the push rod 133 contacting the inclination surface 139 is also downwardly pressed.

Accordingly, the push rod 133 pushes the card 25 into the card inserting hole 17, so that a locked state of the card 25 is released by the card locking unit 24.

At the same time, the locking member 135 connected to the operation button 131 is together moved along the motion direction of the operation button 131, thereby detaching the locking member 135 from the stopping jaw 16.

When the force applied to the operation button 131 is removed, the card 25 pushes the cover 121 and is ejected from the card socket by an elastic unit (not shown) installed at the card socket 23 (Refer to FIG. 8).

That is, like in the first embodiment, a mechanism for releasing each locked state of the card 25 and the cover 121 by one push operation is implemented.

As aforementioned, in the card ejecting mechanism according to the present invention, a locked state of the card 25 is released and the cover 31 is opened by one push operation, thereby enhancing a user's convenience.

Furthermore, since small members such as the push rods 34 and 134 are used to release a locked state of the card 25, the conventional user's finger inserting space for pressing the card is not required thus to enable a miniaturization of the mobile communication terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A card ejecting mechanism, comprising: a body having a card insertion hole through which a card is insertable in a push manner; a cover mounted at the body for covering at least a portion of the card; an operation unit disposed at the cover for releasing a locked state of the cover and releasing a locked state of the card when pushed; an operation button disposed at the cover so as to be movable; and a push rod disposed at the cover so as to be movable up and down for pushing the card by being in contact with the operation button when the operation button is moved; a cover locking portion disposed at the cover for releasing a locked state of the cover when the operation button is horizontally moved.

2. The card ejecting mechanism of claim 1, wherein the card is at least one of a memory card, user identification card, and banking card.

3. The card ejecting mechanism of claim 1, wherein the cover has one end hinge-connected to the body and another end locked at the body by the operation unit.

4. The card ejecting mechanism of claim 1, wherein the operation button is mounted so as to be movable up and down.

5. The card ejecting mechanism of claim 4, wherein the operation button is disposed at a guide groove formed at the cover so as to be movable up and down, and an elastic member for providing an elastic force to the operation button in a lifting direction is formed at a lower surface of the operation button.

6. The card ejecting mechanism of claim 1, wherein the operation button is integrally formed with the cover.

7. The card ejecting mechanism of claim 1, wherein the push rod is integrally formed at a lower surface of the operation button, and has a length long enough to be in contact with an upper surface of the card.

8. The card ejecting mechanism of claim 1, wherein the cover locking portion comprises:
   a locking member slidingly disposed at a slide groove formed at the cover for locking the cover; and
   an operation member connected to the locking member for moving the locking member in a direction to release a locked state of the cover when the operation button is lowered.

9. The card ejecting mechanism of claim 8, wherein the operation member is a wire.

10. The card ejecting mechanism of claim 8, wherein the cover locking portion further comprises an elastic member for restoring the locking member.

11. The card ejecting mechanism of claim 1, wherein an inclined surface for pushing the push rod when the operation button is horizontally moved is formed at a lower surface of the operation button.

12. The card ejecting mechanism of claim 1, wherein an elastic member for providing an elastic force to the push rod in a direction to restore the button is disposed at a lower portion of the push rod.

13. The card ejecting mechanism of claim 1, wherein the cover locking portion comprises:
   a locking member slidingly disposed at a slide groove formed at the cover for locking the cover; and
   an elastic member for providing an elastic force in a direction to restore the locking member.

14. The card ejecting mechanism of claim 1, wherein the card is mounted at the body so as to be locked when pushed and unlocked when re-pushed.

15. A mobile communication terminal, comprising: a terminal body having a card insertion hole through which a card insertable in a push manner; a cover mounted at the terminal body for covering at least some portion of the card; an operation unit disposed at the cover for releasing a locked state of the cover and releasing a locked state of the card when pushed; an operation button disposed at the cover so as to be movable in a horizontal direction; and a push rod disposed at the cover so as to be movable up and down for pushing the card by being in contact with the operation button when the operation button is moved; a cover locking portion disposed at the cover for releasing a locked state of the cover when the operation button is horizontally moved.

16. The mobile communication terminal of claim 15, wherein the card is at least one of a memory card, user identification card, and banking card.

17. The mobile communication terminal of claim 15, wherein the cover has one end hinge-connected to the terminal body and another end locked at the terminal body by the operation unit.

18. The mobile communication terminal of claim 17, wherein the operation button is mounted so as to be movable up and down.

19. The mobile communication terminal of claim 18, wherein the operation button is disposed at a guide groove formed at the cover so as to be movable up and down, and an elastic member for providing an elastic force to the operation button in a lifting direction is formed at a lower surface of the operation button.

20. The mobile communication terminal of claim 17, wherein the operation button is integrally formed with the cover.

21. The mobile communication terminal of claim 17, wherein the push rod is integrally formed at a lower surface of the operation button, and has a length long enough to be in contact with an upper surface of the card.

22. The mobile communication terminal of claim 17, wherein the cover locking portion comprises:
   a locking member slidingly disposed at a slide groove formed at the cover for locking the cover; and
   an operation member connected to the locking member for moving the locking member in a direction to release a locked state of the cover when the operation button is lowered.

23. The mobile communication terminal of claim 22, wherein the operation member is a wire.

24. The mobile communication terminal of claim 22, wherein the cover locking portion further comprises an elastic member for restoring the locking member.

25. The mobile communication terminal of claim 15, wherein an inclined surface for pushing the push rod when the operation button is horizontally moved is formed at a lower surface of the operation button.

26. The mobile communication terminal of claim 15, wherein an elastic member for providing an elastic force to the push rod in a direction to restore the button is disposed at a lower portion of the push rod.

27. The mobile communication terminal of claim 15, wherein the cover locking portion comprises:
   a locking member slidingly disposed at a slide groove formed at the cover for locking the cover; and
   an elastic member for providing an elastic force in a direction to restore the locking member.

28. The mobile communication terminal of claim 15, wherein the card is mounted at the terminal body so as to be locked when pushed and unlocked when re-pushed.

* * * * *